United States Patent
Lee et al.

(10) Patent No.: US 12,126,046 B2
(45) Date of Patent: Oct. 22, 2024

(54) SEPARATOR, METHOD OF MANUFACTURING SEPARATOR, AND ELECTROCHEMICAL DEVICE INCLUDING SEPARATOR

(71) Applicants: SK INNOVATION CO., LTD., Seoul (KR); SK IE TECHNOLOGY CO., LTD., Seoul (KR)

(72) Inventors: Chang Hee Lee, Daejeon (KR); Won Sub Kwack, Daejeon (KR); Tae Wook Kwon, Daejeon (KR); Heung Taek Bae, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/331,500

(22) Filed: Jun. 8, 2023

(65) Prior Publication Data
US 2023/0402715 A1    Dec. 14, 2023

(30) Foreign Application Priority Data
Jun. 9, 2022  (KR) ......................... 10-2022-0070325

(51) Int. Cl.
| | |
|---|---|
| *H01M 50/446* | (2021.01) |
| *H01M 10/052* | (2010.01) |
| *H01M 50/403* | (2021.01) |
| *H01M 50/417* | (2021.01) |

(52) U.S. Cl.
CPC ....... *H01M 50/446* (2021.01); *H01M 10/052* (2013.01); *H01M 50/403* (2021.01); *H01M 50/417* (2021.01)

(58) Field of Classification Search
CPC .. H01M 50/40; H01M 50/446; H01M 50/403; H01M 50/417; H01M 50/443
See application file for complete search history.

(56) References Cited

U.S. PATENT DOCUMENTS

| | | | | |
|---|---|---|---|---|
| 3,925,332 | A * | 12/1975 | Naito | H01M 8/1088 525/344 |
| 2005/0208383 | A1* | 9/2005 | Totsuka | H01M 50/457 429/247 |
| 2014/0120426 | A1 | 5/2014 | Abusleme et al. | |
| 2015/0017512 | A1 | 1/2015 | Terwonne | |
| 2015/0325831 | A1* | 11/2015 | Dennes | H01M 50/489 429/144 |
| 2019/0198837 | A1* | 6/2019 | Yushin | H01M 50/446 |
| 2021/0234229 | A1* | 7/2021 | Bae | B01D 67/0093 |

FOREIGN PATENT DOCUMENTS

| | | |
|---|---|---|
| CN | 1142432 A | 2/1997 |
| EP | 4184699 A2 | 5/2023 |
| EP | 4246698 A1 | 9/2023 |
| JP | 9-159662 A | 6/1997 |
| KR | 10-0148871 B1 | 12/1998 |
| KR | 10-2014-0011136 A | 1/2014 |
| KR | 20150084116 A | 7/2015 |
| KR | 20160073126 A | 6/2016 |
| KR | 10-2021-0059477 A | 5/2021 |

OTHER PUBLICATIONS

Extended European Search Report for the European Patent Application No. 23178461.2 issued by the European Patent Office on Feb. 26, 2024.
Extended European Search Report for the European Patent Application No. 23178461.2 issued by the European Patent Office on Nov. 9, 2023.

* cited by examiner

*Primary Examiner* — Kenneth J Douyette
(74) *Attorney, Agent, or Firm* — IP & T GROUP LLP

(57) ABSTRACT

A separator, a method of manufacturing the separator, and an electrochemical device including the separator with the separator including: a porous substrate; and an inorganic particle layer provided on at least one surface of the porous substrate, wherein the inorganic particle layer includes inorganic particles and a hydrolytic condensate of a silane compound.

8 Claims, No Drawings

SEPARATOR, METHOD OF MANUFACTURING SEPARATOR, AND ELECTROCHEMICAL DEVICE INCLUDING SEPARATOR

CROSS-REFERENCE TO RELATED APPLICATIONS

This application claims priority under 35 U.S.C. § 119 to Korean Patent Application No. 10-2022-0070325, filed on Jun. 9, 2022, the disclosure of which is incorporated herein by reference in its entirety.

TECHNICAL FIELD

The following disclosure relates to a separator for a secondary battery, capable of simultaneously securing significantly improved high heat resistance and electrical characteristics, a method of manufacturing the separator, and an electrochemical device including the separator.

More particularly, the following disclosure relates to a method of evaluating a heat resistance of a separator.

BACKGROUND

Thermal stability of a separator is a physical property that aids in securing the safety of users because thermal stability prevents and/or reduces deformation of the separator at a high temperature and reduces a risk of fire in an electrochemical device. A polyolefin or the like, which is mainly used for a substrate of the separator, has a melting point of around 140° C., and a polyolefin-based porous separator is insufficient in terms of safety due to a risk of an internal short circuit caused by shrinkage at a high temperature due to material characteristics and manufacturing process characteristics.

In order to improve the thermal stability of the polyolefin-based porous separator, recently, an organic-inorganic composite porous separator has been considered. The organic-inorganic composite porous separator was provided with a porous inorganic particle layer formed by coating a slurry composition of inorganic particles and a binder polymer on a polyolefin porous substrate so that the inorganic particles are connected to each other on one surface or both surfaces of the porous substrate to form pores between the inorganic particles.

However, even when the inorganic particle layer described above is formed on the surface of the porous polymer substrate, it is required to further reduce a heat shrinkage rate of the separator at a high temperature for the safety of users, and at the same time, it is required to improve electrical resistance characteristics.

RELATED ART DOCUMENT

Patent Document (Patent Document 1) Korean Patent Laid-Open Publication No. 10-2014-00011136 (Jan. 28, 2014)

SUMMARY

An embodiment of the present disclosure is directed to providing a separator simultaneously having significantly improved thermal stability and electrical characteristics, a method of manufacturing the separator, and an electrochemical device including the separator.

In one general aspect, a separator includes: a porous substrate; and an inorganic particle layer provided on at least one surface of the porous substrate, wherein the separator satisfies the following Relation (1):

$$T_1 - T_0 \geq 30\% \quad (1)$$

wherein $T_0$ is a light transmittance measured by allowing the separator to stand at 25° C. for 1 hour and then vertically spacing the separator apart from a halogen lamp with a rated voltage of 12 V and a power consumption of 50 W by 100 mm, and $T_1$ is a light transmittance measured by allowing the separator to stand at 150° C. for 1 hour and then vertically spacing the separator apart from a halogen lamp with a rated voltage of 12 V and a power consumption of 50 W by 100 mm.

In an embodiment, the $T_1 - T_0$ value of Relation (1) may be 40% or more.

In an embodiment, when specimens each having a thickness of 5 to 50 μm, a width of 5 mm, and a length of 10 mm in each of a machine direction (MD) and a transverse direction (TD) serving as length directions are prepared from the separator, and the specimen is mounted on a chamber of a thermomechanical analyzer (TMA) by hooking both ends of the specimen to a metal jig and pulled downward with a force of 0.008 N while heating at 5° C. per minute, the specimen may have heat resistance in which the specimen is broken at a temperature of 180° C. or higher in both MD and TD.

In an embodiment, a heat shrinkage rate in each of MD and TD may be 8% or less when measured after the separator is allowed to stand at 150° C. for 60 minutes.

In an embodiment, the inorganic particle layer may include inorganic particles and a hydrolytic condensate of a silane compound.

In an embodiment, the hydrolytic condensate of the silane compound may be a hydrolytic condensate produced under a condition in which the silane compound is hydrolyzed and is condensation-suppressed in a weakly acidic atmosphere.

In an embodiment, a number average molecular weight of the hydrolytic condensate of the silane compound may be 4,000 g/mol or less.

In an embodiment, the silane compound may be a compound represented by the following Chemical Formula 1:

$$A_a Si(OR)_b \quad \text{Chemical Formula 1}$$

wherein 'A' is hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4.

In an embodiment, the polar functional group may include one or two or more of an amino group, an epoxy group, a carboxyl group, a hydroxyl group, an amide group, a thiol group, a ketone group, an ester group, and an aldehyde group.

In an embodiment, an average particle diameter of the inorganic particles may be 0.01 to 1 μm.

In an embodiment, the porous substrate may have a surface including a polar functional group.

In another general aspect, a method of manufacturing a separator includes: (a) adding inorganic particles and an acid component to an aqueous solution of a silane compound represented by the following Chemical Formula 1, and performing stirring or bubbling to prepare a slurry in a weakly acidic atmosphere; and (b) applying the prepared slurry on at least one surface of a porous substrate and drying the slurry to provide an inorganic particle layer on at least one surface of the porous substrate:

$$A_a Si(OR)_b \quad \text{Chemical Formula 1}$$

wherein 'A' is hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4.

In an embodiment, the process (a) may be performed in a weakly acidic atmosphere of more than pH 4 and pH 7 or less.

In an embodiment, the process (b) may further include applying the prepared slurry on at least one surface of the porous substrate and then allowing the applied slurry to stand for 5 minutes or longer.

In an embodiment, the polar functional group of the silane compound may include one or two or more selected from an amino group, an epoxy group, a carboxyl group, a hydroxyl group, an amide group, a thiol group, a ketone group, an ester group, and an aldehyde group.

In an embodiment, the acid component may be carbon dioxide, or an organic acid including one or two selected from acetic acid and lactic acid.

In an embodiment, the inorganic particles may be boehmite.

The method of manufacturing a separator according to an embodiment may further include, after the process (b), (c) aging the porous substrate having the at least one surface on which the inorganic particle layer is provided.

In an embodiment, a surface of the porous substrate may be subjected to a hydrophilic surface treatment.

In an embodiment, the hydrophilic surface treatment may include one or more of a corona discharge treatment and a plasma discharge treatment.

In an embodiment, the inorganic particles and the silane compound of Chemical Formula 1 may be included in the slurry at a weight ratio of 70 to 99.9:30 to 0.1.

In still another general aspect, a method of evaluating thermal stability of a separator includes comparing an absolute value of the following Relation (1) with a predetermined reference value to evaluate thermal stability of a porous separator:

$$T_1 - T_0 \quad (1)$$

wherein $T_0$ is a light transmittance measured after allowing the separator to stand at $t_0°$ C. for 1 hour, $T_1$ is a light transmittance measured after allowing the separator to stand at $t_1°$ C. for 1 hour, and $t_0$ and $t_1$ are different temperatures.

In an embodiment, the porous separator may include a porous substrate, and an inorganic particle layer formed on at least one surface of the porous substrate and having pores formed by inorganic particles adjacent to each other.

In an embodiment, the porous substrate may be a polyolefin-based porous substrate.

In an embodiment, $t_0$ may be 25° C. and $t_1$ may be 150° C.

In an embodiment, the light transmittance may be a light transmittance measured by vertically spacing the separator apart from a halogen lamp with a rated voltage of 12 V and a power consumption of 50 W by 100 mm.

In an embodiment, the predetermined reference value may be 30%.

In still another general aspect, an electrochemical device includes the separator according to an exemplary embodiment described above.

Other features and aspects will be apparent from the following detailed description, and the claims.

DETAILED DESCRIPTION OF EMBODIMENTS

Hereinafter, the present invention will be described in more detail with reference to specific embodiments. However, each of the following embodiments is merely one example, and the present disclosure is not limited thereto and may be implemented in various forms.

In addition, unless otherwise defined, all the technical terms and scientific terms have their plain and ordinary meanings as commonly understood by those skilled in the art to which the present disclosure pertains. The terms used in the description of the present disclosure are used to describe specific embodiments, but are not intended to limit the present disclosure.

In addition, unless the context clearly indicates otherwise, singular forms of the terms used in the specification and the appended claims include plural forms.

In addition, unless explicitly described to the contrary, the term "comprising" includes other components rather than the exclusion of any other components.

In the present specification, "D50" refers to a particle diameter of inorganic particles which corresponds to 50% of a volume-based integration fraction. "D80" refers to a particle diameter of inorganic particles which corresponds to 80% of a volume-based integration fraction. "D20" refers to a particle diameter of inorganic particles which corresponds to 20% of a volume-based integration fraction. D50, D80, and D20 may be derived from particle size distribution results obtained by collecting a sample of the inorganic particles to be measured in accordance with the standard of KS A ISO 13320-1 and performing analysis using a Multisizer 4e Coulter counter available from Beckman Coulter Inc.

According to an embodiment of the present disclosure, a separator may include: a porous substrate; and an inorganic particle layer provided on at least one surface of the porous substrate, wherein a value of the following Relation (1) of the separator is 30% or more:

$$T_1 - T_0 \quad (1)$$

wherein $T_0$ is a light transmittance measured by allowing the separator to stand at 25° C. for 1 hour and then vertically spacing the separator apart from a halogen lamp with a rated voltage of 12 V and a power consumption of 50 W by 100 mm, and $T_1$ is a light transmittance measured by allowing the separator to stand at 150° C. for 1 hour and then vertically spacing the separator apart from a halogen lamp with a rated voltage of 12 V and a power consumption of 50 W by 100 mm.

In one embodiment, the heat-resistant separator of the present disclosure was obtained by the inventors by recognizing for the first time that it is possible to provide a separator simultaneously having significantly improved heat resistance and electrical characteristics when a range of the value of the specific Relation (1) is satisfied. Specifically, the value of Relation (1) for an amount of change in light transmittance is influenced (in a complex way) by a thickness of the inorganic particle layer, a particle diameter of the inorganic particle, a porosity and thickness of the porous substrate, and the like.

In particular, the present disclosure was obtained by the inventors recognizing for the first time that a case (in which a difference between a light transmittance value $T_1$ measured after the separator is subjected to a first temperature of 150° C. for 1 hour and a light transmittance value $T_0$ measured after the separator is subjected to a second temperature of 25° C. for 1 hour is 30% or more) is one condition for improving and providing excellent heat resistance, heat shrinkage characteristics, and electrical characteristics for the separator.

In one embodiment, the thermal stability and electrical characteristics of the separator may be further improved by controlling the value of the specific Relation (1) to 35% or more or 40% or more.

When the separator of an embodiment satisfies Relation (1), and also satisfies a heat shrinkage rate in both a machine direction (MD) and a transverse direction (TD) of 8% or less, 5% or less, 3% or less, or 2.5% or less when measured after the separator is allowed to stand at 150° C. for 60 minutes, in particular, the electrical characteristics of the separator may be significantly improved.

In the following description, two types of specimens with a width of 5 mm and a length of 10 mm were prepared, with one specimen having a length direction in the machine direction and the other specimen having a length direction in a transverse direction. In this embodiment, when specimens each having a thickness of 5 to 50 µm, a width of 5 mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, in a case where the separator has heat resistance in which at least one of the specimens is broken only at a temperature of 180° C. or higher, 190° C. or higher, 200° C. or higher, or 210° C. or higher in both MD and TD, the thermal stability and the electrical characteristics of the separator may be further improved. In one embodiment, the two types of specimens were not broken until after a temperature of 180° C. was reached.

In one embodiment, even when Relation (1) is satisfied, in a case where the heat shrinkage rate or the TMA melt fracture temperature condition is not satisfied, the electrical characteristics may not have the values reported here in the present disclosure. When Relation (1) is satisfied, but the heat shrinkage rate or the TMA melt fracture temperature condition is not satisfied due to factors such as a pore structure or a distribution of pores of the porous substrate, it is considered that the separator may not have exemplary electrical characteristics such as those disclosed here.

One embodiment for providing the above physical properties includes a secondary battery separator, in which an inorganic particle layer in which pores are formed by connecting inorganic particles to each other is provided on at least one surface of a porous substrate such as a polyethylene film. In this embodiment, a separator using a hydrolytic condensate of a silane compound as a binder for the inorganic particle layer and satisfying Relation (1) and at least one of the heat shrinkage rate or the TMA melt fracture temperature condition may provide an electrochemical device having excellent electrical characteristics as well as thermal stability, the hydrolytic condensate of the silane compound being prepared under a specific condition in which a silanol or alkoxysilane-based compound is hydrolyzed and is condensation-suppressed.

In an embodiment, in a case where Relation (1) is satisfied, a method of simultaneously imparting thermal stability and electrical characteristics is not particularly limited. However, examples of one method of imparting the above physical properties are described below and include manufacturing a separator including an inorganic particle layer in which pores are formed by connecting inorganic particles to each other by condensing a silane compound under a condition in which the silane compound is hydrolyzed and is condensation-suppressed and by applying a slurry obtained by mixing the hydrolytic condensate of the silane compound with inorganic particles on at least one surface of a porous substrate formed of polyethylene or the like, but the method is not limited to these details.

Hereinafter, each component of the separator according to various embodiments of the present invention will be described.

According to an embodiment, a polyolefin-based porous substrate including polyethylene, polypropylene, or a copolymer thereof as a main component may be used as the porous substrate, and the porous substrate may be a film or sheet formed of one or two or more resins selected from the group consisting of polyethylene, polypropylene, and a copolymer thereof.

A thickness of the porous substrate is not particularly limited, and may be, for example, 1 µm or more, 3 µm or more, 5 µm or more, 100 µm or less, 50 µm or less, 30 µm or less, 20 µm or less, or between the numerical values. As a non-limiting example, the thickness of the porous substrate may be 1 to 100 µm, for example 5 to 50 µm, and for example 5 to 30 µm. According to an example, the porous substrate may be a porous polymer substrate produced by stretching.

In one embodiment, the porous substrate may have a surface including a polar functional group. Non-limiting examples of the polar functional group include a carboxyl group, an aldehyde group, and a hydroxyl group. The polar functional group may be introduced by a hydrophilic surface treatment in an embodiment, and the hydrophilic surface treatment may include one or more of a corona discharge treatment and a plasma discharge treatment in an embodiment. The polar functional group provided on the surface of the porous substrate is useful because it may further improve an adhesive strength between the porous substrate and the inorganic particle layer by hydrogen bonding or chemical bonding to a polar functional group of a hydrolytic condensate of a silane compound as a binder described below, and may improve thermal stability by further reducing the heat shrinkage rate at a high temperature.

In an embodiment, the inorganic particle layer may include inorganic particles and a hydrolytic condensate of a silane compound, and may be a porous inorganic particle layer in which pores are formed by connecting and fixing inorganic particles together by the hydrolytic condensate of the silane compound. In an embodiment, the inorganic particle layer may be provided on at least one surface of the porous substrate, and may have an area fraction of 60% or more, 70% or more, 80% or more, or 90% or more based on a percentage of the entire surface of the porous substrate.

In an embodiment, the inorganic particle layer may be coated on one surface, and on both surfaces of the porous substrate, and when the inorganic particle layer is coated on both surfaces of the porous substrate, a thickness of the inorganic particle layer coated on one surface and a thickness of the inorganic particle layer coated on the other surface may be the same as or different from each other. Although not particularly limited, in one embodiment, the thickness of the inorganic particle layer coated on one surface may be more than 0 µm, 0.3 µm or more, 0.5 µm or more, 3 µm or less, 2.5 µm or less, 2 µm or less, 1.5 µm or less, 1 µm or less, or any value between these numerical values. In a specific embodiment, the thickness of the inorganic particle layer may be more than 0 µm and 2.5 µm or less or more than 0 µm and 2 µm or less, more than 0 µm and 1.5 µm or less, and more than 0 µm and 1 µm or less.

In one embodiment, the inorganic particles are not limited. As a non-limiting example, the inorganic particles may include one or two or more of a metal hydroxide, a metal oxide, a metal nitride, and a metal carbide, and more specifically, may include one or two or more of $SiO_2$, SiC, MgO, $Y_2O_3$, $Al_2O_3$, $CeO_2$, CaO, ZnO, $SrTiO_3$, $ZrO_2$, $TiO_2$, and AlO(OH). From the viewpoint of battery stability and the like, the inorganic particles may be metal hydroxide particles such as boehmite.

The metal hydroxide is not particularly limited, and as a non-limiting example, the metal hydroxide may include one or two or more of boehmite, aluminum hydroxide, and magnesium hydroxide.

In an embodiment, when the boehmite is used, a specific surface area (BET) of the inorganic particles may be 10 $m^2/g$ or more or 15 $m^2/g$ or more.

An average particle diameter (D50) of the inorganic particles may be 0.01 μm or more, 0.05 μm or more, 0.1 μm or more, 5 μm or less, 1 μm or less, 0.5 μm or less, or between the numerical values. As a non-limiting example, the average particle diameter (D50) of the inorganic particles may be 0.01 to 5 μm, for example 0.01 to 1 μm, and for example 0.01 to 0.5 μm.

Next, in one embodiment, a binder that connects the inorganic particles to form the inorganic particle layer in which pores are formed will be described. In this embodiment, the binder may be a low molecular weight condensate obtained by condensing a silane compound represented by the following Chemical Formula 1 and having a significantly suppressed molecular weight.

   Chemical Formula 1

In Chemical Formula 1, A is a hydrogen group, a polar functional group, or a C1-C10 alkyl group having a polar functional group, 'R' is independently hydrogen or a C1-C5 alkyl group, 'a' is 0 to 2, 'b' is 2 to 4, and a+b is 4. In one embodiment, a low molecular weight condensate is obtained by condensation using the silane compound of Chemical Formula 1 in which b is 3.

The polar functional group of the silane compound may include one or two or more selected from an amino group, an epoxy group, a carboxyl group, a hydroxyl group, an amide group, a thiol group, a ketone group, an ester group, and an aldehyde group, or may be a reactive group that reacts with these groups. According to an embodiment of the present disclosure, the polar functional group may be an amino group.

As a non-limiting example, the silane compound satisfying Chemical Formula 1 may be one or a mixture of two or more silane compounds selected from (3-aminopropyl)triethoxysilane, (3-aminopropyl)trimethoxysilane, and (3-glycidyloxypropyl) trimethoxysilane, but the present disclosure is not limited thereto.

In an embodiment, the hydrolytic condensate of the silane compound has a low molecular weight because it is prepared under a condition in which the silane compound is hydrolyzed and is condensation-suppressed. In an embodiment, the hydrolytic condensate of the silane compound may be a hydrolytic condensate produced under a condition in which the silane compound is hydrolyzed and is condensation-suppressed in a weakly acidic atmosphere, and may be prepared to have a significantly low molecular weight because a condensation reaction is suppressed in a weakly acidic atmosphere. In an embodiment, the hydrolytic condensate of the silane compound may be a low molecular weight hydrolytic condensate having a number average molecular weight of, for example, 4,000 g/mol or less, 2,000 g/mol or less, or 1,000 g/mol or less.

Meanwhile, in general, when the silane compound of Chemical Formula 1 is condensed with a strong acid such as an inorganic acid, a polysiloxane condensate having a number average molecular weight of more than 4,000 g/mol is produced. On the other hand, the hydrolytic condensate of the silane compound according to another embodiment of the present disclosure produced under the condition in which condensation of the silane compound is suppressed differs from the general case in that it is a hydrolytic condensate including a hydrolysate itself, an unreacted product in a form of a monomer, and a dimer hydrolytic condensate as main components, and a trace amount of a trimer hydrolytic condensate or a tetramer hydrolytic condensate.

That is, in an embodiment, the hydrolytic condensate of the silane compound may include one or two or more selected from a hydrolysate, a monomer, and a multimer, such as a hydrolyzed and condensed dimer, trimer, tetramer, or pentamer, of the silane compound.

The low molecular weight hydrolytic condensate of the silane compound as described above was confirmed from a detection peak detected in positive ESI-MS analysis using positive electrospray ionization Fourier-transform ion cyclotron resonance Mass Spectrometry analysis (posESI FT-ICRMS) (manufacturer: Bruker Corporation, model name: Solarix 2XR). That is, as a result of the positive ESI-MS analysis, peaks of silanol, which is a hydrolysate, and a dimer, which is a condensate, were mainly observed, and peaks of trace amounts of a trimer and a tetramer were observed, and peaks of a pentamer or higher multimer were hardly detected within one day or two days, which is a period for preparing a slurry. However, in a case where a silane compound is hydrolyzed and condensed using hydrochloric acid, which is an inorganic acid, for 24 hours, complex peaks of high molecular weight hydrolytic condensates were observed. That is, from these results, it was confirmed that the hydrolytic condensate of the silane compound prepared in a weakly acidic atmosphere is a material different from the hydrolytic condensate prepared with a general inorganic acid or the like.

The hydrolytic condensate of the silane compound according to an embodiment may be prepared with a relatively low molecular weight by condensing a silane compound having a polar functional group under a condition in which a condensation reaction is relatively suppressed compared to a hydrolysis reaction, and may secure a large fraction of the polar functional group at the same weight as compared to a high molecular weight polysiloxane condensate generally prepared by condensation with an inorganic acid or the like. Accordingly, the hydrolytic condensate of the silane compound may further improve the adhesive strength between the inorganic particles, and may impart remarkable heat resistance.

In addition, in an embodiment, when a polar functional group is introduced into the surface of the porous substrate, as the polar functional group provided on the surface of the porous substrate is hydrogen-bonded or chemically bonded to the polar functional group of the hydrolytic condensate of the silane compound as a binder, the adhesive strength between the porous substrate and the inorganic particle layer may be further improved, and the high-temperature shrinkage rate at a high temperature may be further reduced to improve thermal stability.

Next, an embodiment of a method of manufacturing the separator will be described.

In this embodiment, a method of manufacturing a separator may include: (a) adding inorganic particles and an acid component to an aqueous solution of a silane compound represented by the following Chemical Formula 1, and performing stirring or bubbling to prepare a slurry in a weakly acidic atmosphere; and (b) applying the prepared slurry on at least one surface of a porous substrate and drying the slurry to provide an inorganic particle layer on at least one surface of the porous substrate, wherein the separator satisfies Relation (1). The processes (a) and (b) may be performed under various conditions or methods without limitation.

$$A_a Si(OR)_b \qquad \text{Chemical Formula 1}$$

In Chemical Formula 1, 'A' is hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4.

The polar functional group may include one or two or more of an amino group, an epoxy group, a carboxyl group, a hydroxyl group, an amide group, a thiol group, a ketone group, an ester group, and an aldehyde group, or may be a reactive group that reacts with these groups.

Hereinafter, each process of the method of manufacturing a separator according to various embodiments will be described. Descriptions of the silane compound, the inorganic particles, and the porous substrate are the same as those described above, and thus are omitted for convenience.

According to an embodiment of the present disclosure, in the process (a), the silane compound is prepared as a hydrolytic condensate of the silane compound in a weakly acidic atmosphere in which a condensation reaction is relatively suppressed as compared to a hydrolysis reaction. As a result, the hydrolytic condensate of the silane compound has a low molecular weight, which is different from a general polysiloxane condensate having a number average molecular weight of several thousand by condensation with a strong acid such as an inorganic acid.

In this embodiment, the process (a) may be performed in a weakly acidic atmosphere of more than pH 4 and pH 7 or less. When a hydrolysis-condensation reaction is performed in a case of pH 4 or less, in a case of a basic atmosphere (more than pH 7), or in a case of using an inorganic acid such as sulfuric acid or hydrochloric acid, dispersibility of the prepared slurry may be reduced, the average particle diameter of the inorganic particles may increase due to aggregation between the inorganic particles, and a low molecular weight hydrolytic condensate of the silane compound may not be obtained, and as a result, the heat resistance or the adhesive strength of the separator may be reduced. From the above point of view, the weakly acidic atmosphere may be more than pH 4, pH 4.5 or more, pH 5 or more, pH 5.5 or more, pH 6 or more, pH 6.5 or more and pH 7 or less, or any value between these numerical values. In an embodiment, the weakly acidic atmosphere may be more than pH 4 and pH 7 or less, or pH 4.5 or more and pH 7 or less.

In addition, in the process (a) of preparing the slurry, a method or order of adding the components constituting the slurry is not particularly limited, and other possible methods may be used. For example, in an embodiment, an acid aqueous solution including a silane compound represented by Chemical Formula 1 and an acid component is separately prepared, an inorganic slurry is separately prepared by stirring inorganic particles, an acid component, and water, and then the separately prepared acid aqueous solution and inorganic slurry are stirred, thereby preparing a slurry.

According to an embodiment, the acid component in the process (a) may be carbon dioxide, or an organic acid including one or two acids selected from acetic acid and lactic acid. Carbon dioxide may become carbonic acid when added to the aqueous solution of the silane compound and then stirred or bubbled. When the acid component is used, the effect of the present disclosure can be achieved, and the condensation reaction can be suppressed in the above-noted pH range(s), but the present disclosure is not limited thereto.

According to another embodiment, the inorganic particles and the silane compound of Chemical Formula 1 may be included in the slurry at a weight ratio of 70 to 99.9:30 to 0.1, 80 to 99.9:20 to 0.1, or 90 to 99.9:10 to 0.1, but the present disclosure is not particularly limited.

As a method of preparing the slurry, common methods of preparing slurries may be applied without limitation, and although not particularly limited, according to a non-limiting example, a slurry may be prepared by dispersing inorganic particles at 0 to 60° C. for 1 hour to 5 days, and aggregated inorganic particles may be dispersed using a ball mill.

According to another embodiment of the present disclosure, in the process (b), an inorganic particle layer may be provided on at least one surface of the separator. As a method of applying the slurry, common methods may be applied without limitation. The drying to form the inorganic particle layer is not particularly limited, and may be performed at 100° C. or lower or from 30 to 60° C.

Unlike a general process of applying a slurry on a porous substrate and then immediately transferring the porous substrate on which the slurry is applied to a dryer within 1 minute for drying, according to an embodiment of the present disclosure, in the process (b), as a method that may further satisfy Relation (1), a process of applying the slurry and then allowing the slurry to stand at room temperature for 5 minutes or longer may be included. This process of allowing the slurry to stand for 5 minutes or longer may provide time for rearrangement of the inorganic particles and the hydrolytic condensate of the silane compound in the slurry. Relation (1) may be more readily satisfied with this embodiment. While the standing time can be made longer, when the standing time is too long, the process efficiency may be impaired. In view of these considerations, the standing time may be 5 minutes or longer, 8 minutes or longer, 10 minutes or longer, 30 minutes or shorter, 25 minutes or shorter, 20 minutes or shorter, or between the numerical values. As a non-limiting specific example, the standing time may be 5 to 30 minutes or 5 to 25 minutes.

In one embodiment, the method of manufacturing a separator may further include, after the process (b), (c) aging the porous substrate having the at least one surface on which the inorganic particle layer is provided. Specifically, the aging may be performed at 50 to 150° C., and/or may be performed at 65 to 120° C., and the aging may be performed for 2 hours to 24 hours, and/or may be performed for 10 to 20 hours. In one embodiment, the aging may be performed in a temperature range of 70 to 120° C. for 10 to 15 hours. Through the aging, the adhesive strength between the porous substrate and the inorganic particle layer may be increased, and the high-temperature shrinkage characteristics may be improved.

That is, the method of manufacturing a separator according to an embodiment of the present disclosure further includes an aging process, such that high-temperature shrinkage characteristics may be further improved through a stable and strong chemical bonding between the porous substrate and the inorganic particle layer, thereby providing a method of manufacturing a separator having further improved thermal stability. In addition, the adhesive strength between the porous substrate and the inorganic particle layer may be further improved.

In addition, in one embodiment, when a polar functional group is introduced into the surface of the porous substrate, as the polar functional group provided on the surface of the porous substrate is hydrogen-bonded or chemically bonded to the polar functional group of the hydrolytic condensate of the silane compound as a binder, the adhesive strength between the porous substrate and the inorganic particle layer may be further improved, and the high-temperature shrinkage rate at a high temperature may be further reduced to improve thermal stability. Examples of a method of introducing a polar functional group into the surface of the porous substrate include a hydrophilic surface treatment. According to an example, the hydrophilic surface treatment may include one or more of a corona discharge treatment and a plasma discharge treatment in an air, oxygen, or ozone atmosphere. Examples of the polar functional group introduced into the surface of the porous substrate include, but are not particularly limited to, a carboxyl group, an aldehyde group, and a hydroxyl group.

In addition, another embodiment of the present disclosure provides a method of evaluating thermal stability of a porous separator.

In this embodiment, a method of evaluating thermal stability of a separator includes comparing an absolute value of the following Relation (1) with a predetermined reference value to evaluate thermal stability of a porous separator:

$$T_1 - T_0 \quad (1)$$

wherein $T_0$ is a light transmittance measured after subjecting the separator to a first temperature of $t_0$° C. for 1 hour, $T_1$ is a light transmittance measured after subjecting the separator to a second temperature of stand at $t_1$° C. for 1 hour, and $t_0$ and $t_1$ are different temperatures.

Specifically, the value of the specific Relation (1) related to an amount of change in light transmittance is influenced in a complex way by the thickness of the inorganic particle layer, the particle diameter of the inorganic particle, the thickness of the porous substrate, the porosity of the porous substrate, and the type and composition of the binder included in the inorganic particle layer.

This method of evaluating thermal stability of a separator was obtained by the inventors recognizing for the first time that the separator may secure excellent heat resistance and heat shrinkage characteristics when the value of the amount of change is equal to or higher than a specific level.

In embodiment, the porous separator may be any porous separator, and is not particularly limited.

In an embodiment, the porous separator may include a porous substrate, and an inorganic particle layer formed on at least one surface of the porous substrate and having pores formed by inorganic particles adjacent to each other. Porous substrates and inorganic particles may be used as the porous substrate and the inorganic particles, and although not particularly limited, in an embodiment, the porous substrate and the inorganic particles described herein may be used. In an embodiment, the porous substrate may be a polyolefin-based porous substrate.

In an embodiment, to may be 25° C. and $t_1$ may be 150° C., but $t_0$ and $t_1$ are not particularly limited.

In an embodiment, the light transmittance may be measured with a halogen lamp with a rated voltage of 12 V and a power consumption of 50 W, and the light transmittance is measured by vertically spacing the separator fixed in a specimen holder of a colorimeter (COH 400, Nippon Denshoku Industries Co., Ltd.) from a halogen lamp (12 V/50 W, 7027, Philips) by 100 mm. The light transmittance is expressed as a percentage obtained by dividing the intensity of the transmitted light by the intensity of the incident light.

The predetermined reference value is a reference value for evaluating the thermal stability of the separator and is not particularly limited. The predetermined reference value may be determined. In an embodiment, as a result of comparing the absolute value of Relation (1) with the predetermined reference value, when the absolute value of Relation (1) is equal to or greater than the predetermined reference value, the separator may be evaluated as having excellent thermal stability, but the present disclosure is not particularly limited.

In one embodiment, as a reference value for evaluating significantly excellent thermal stability, the predetermined reference value may be 30%, 35%, or 40%, but the present disclosure is not particularly limited.

As a representative method of evaluating thermal stability according to the related art, a method of evaluating thermal stability by marking a reference point on a separator and deriving a heat shrinkage rate from a change in distance of the reference point on the separator after a heat treatment is inefficient because a pre-treatment process to mark the reference point is necessarily required, and errors may occur depending on a reference marking method. On the other hand, the method of evaluating thermal stability of a separator according to an embodiment of the present disclosure is efficient because the pre-treatment process such as marking a reference point is not required, and is performed by evaluating the thermal stability of the separator using the absolute value of the amount of change in light transmittance, such that the evaluation method is simple and accurate with a narrow margin of error.

According to another embodiment of the present disclosure, it is possible to provide an electrochemical device including the separator according to the embodiments described above. The electrochemical device may be an energy storage device, but the present disclosure is not particularly limited. As a non-limiting example, the electrochemical device may be a lithium secondary battery. Since the lithium secondary battery is well known and a configuration thereof is also known, the lithium secondary battery is not described in detail in the present disclosure.

The lithium secondary battery according to another embodiment of the present disclosure may include the separator described above between a positive electrode and a negative electrode. In this case, any positive electrode and negative electrode may be used without limitation.

Hereinafter, the present disclosure provides more detail(s) with reference to Examples and Comparative Examples. However, the following Examples and Comparative Examples are only examples for describing the present disclosure in more detail, and the present disclosure is not limited by the following Examples and Comparative Examples.

First, the methods for measuring and evaluating the physical properties of the separator will be described.

Heat Shrinkage Rate

A heat shrinkage rate of the separator was measured based on ASTM D 1204 by the following method. Grid points were marked at intervals of 2 cm on a square with one side of 10 cm on the separator. One side of the square was in a transverse direction (TD), and the other side of the square was in a machine direction (MD). A specimen was placed in the central portion, five sheets of paper were placed on each of the top and bottom of the specimen, and four sides of the paper were wrapped with a tape. The specimen wrapped with the paper was allowed to stand in a hot air drying oven at 150° C. for 60 minutes. Thereafter, the specimen was taken out, the separator was observed with a camera, and a shrinkage rate in a length direction of the following Equation 1 and a shrinkage rate in a width direction of the following Equation 2 were calculated.

Shrinkage rate (%) in length direction=(Length in length direction before heating−Length in length direction after heating)×100/Length in length direction before heating      Equation 1

Shrinkage rate (%) in width direction=(Length in width direction before heating−Length in width direction after heating)×100/Length in width direction before heating      Equation 2

TMA Melt Fracture Temperature

Two types of specimens of the separator with a width of 5 mm and a length of 10 mm were prepared, with one specimen having a length direction in the machine direction and the other specimen having a length direction in a transverse direction. The specimens each having a thickness of 5 to 50 μm, a width of 5 mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the temperature at which the specimen was broken in each of MD and TD was recorded.

Light Transmittances ($T_1$ and $T_0$) and Amount of Change in Light Transmittance ($T_1-T_0$)

The measurement conditions of $T_0$ and $T_1$ were as follows.

$T_0$ was a light transmittance measured by allowing the separator to stand at 25° C. for 1 hour and then vertically spacing the separator apart from a halogen lamp with a rated voltage of 12 V and a power consumption of 50 W by 100 mm. As for the condition for allowing the separator to stand, the separator was cut out to prepare a square specimen with one side of 10 cm, five sheets of paper each having the same size as the specimen were placed on each of the top and bottom of the specimen, four sides of the paper were wrapped with a tape, the separator wrapped with the paper was allowed to stand in a hot air drying oven at 25° C. for 1 hour, and then the separator was cooled at room temperature.

$T_1$ was a light transmittance measured by allowing the separator to stand at 150° C. for 1 hour and then vertically spacing the separator apart from a halogen lamp with a rated voltage of 12 V and a power consumption of 50 W by 100 mm. As for the condition for allowing the separator to stand, the separator was cut out to prepare a square specimen with one side of 10 cm, five sheets of paper each having the same size as the specimen were placed on each of the top and bottom of the specimen, four sides of the paper were wrapped with a tape, the separator wrapped with the paper was allowed to stand in a hot air drying oven at 150° C. for 1 hour, and then the separator was cooled at room temperature.

The light transmittance was measured by vertically spacing the separator fixed in a specimen holder of a colorimeter (COH 400, Nippon Denshoku Industries Co., Ltd.) from a halogen lamp (12 V/50 W, 7027, Philips) by 100 mm, and the measured light transmittance was expressed as a percentage obtained by dividing the intensity of the transmitted light by the intensity of the incident light.

The "$T_1-T_0$" value was derived by subtracting $T_0$ from $T_1$ obtained as described above.

Battery Resistance

A battery was manufactured under the following conditions, and a discharge resistance was measured by a J-pulse method.

Manufacture of Battery 94 wt % of $LiCoO_2$ as a positive electrode active material, 2.5 wt % of polyvinylidene fluoride as a fusion adhesive, and 3.5 wt % of carbon black as a conductive agent were added to N-methyl-2-prrolidone (NMP) as a solvent, and stirring was performed to prepare a uniform positive electrode slurry. The prepared positive electrode slurry was coated, dried, and compressed on an aluminum foil having a thickness of 30 μm to prepare a positive electrode having a total thickness of 150 μm. 95 wt % of artificial graphite as a negative electrode active material, 3 wt % of acrylic latex having a Tg of −52° C. as a fusion adhesive, and 2 wt % of carboxymethyl cellulose (CMC) as a thickener were added to water as a solvent, and stirring was performed to prepare a uniform negative electrode slurry. The prepared negative electrode slurry was coated, dried, and compressed on an aluminum foil having a thickness of 20 μm to prepare a negative electrode having a total thickness of 150 μm. The prepared positive electrode, negative electrode, and separator were assembled into a pouch-type battery by stacking the positive electrode, negative electrode, and separator so that the separator was interposed between the positive electrode and the negative electrode, and then the assembled battery was heat-fused at 80° C. and 1 MPa of pressure was applied with a heat press machine in order to fuse the positive electrode, the negative electrode, and the separator to each other. Thereafter, an electrolyte solution in which 1 M lithium hexafluorophosphate ($LiPF_6$) was dissolved was injected into a solution including ethylene carbonate (EC), ethylmethyl carbonate (EMC), and dimethyl carbonate (DMC) at a volume ratio of 30:50:20, and then the battery was sealed, thereby manufacturing a secondary battery having a capacity of 2 Ah.

EXAMPLES

Example 1

Preparation of Slurry

To 100 parts by weight of distilled water, 3.41 parts by weight of (3-aminopropyl)silanetriol was added, and 30 parts by weight of boehmite having an average particle diameter (D50) of 0.32 μm as inorganic particles was added while $CO_2$ bubbling was performed using dry ice. A slurry was prepared by performing bubbling for a total of 48 hours while maintaining the internal pH at 4 to 5 during the $CO_2$ bubbling.

Porous Substrate

A polyethylene porous film (porosity: 48%, Gurley permeability: 82 sec./100 cc, tensile strength MD: 2,020 kgf/$cm^2$/TD: 1,950 kgf/$cm^2$) having a thickness of 9 μm was used as a porous substrate, both surfaces of the polyethylene porous film were subjected to a corona discharge treatment (power density: 2 W/mm) to introduce a surface polar group, and at this time, the corona surface treatment was performed at a rate of 3 to 20 mpm (meter per minute).

Manufacture of Separator

The slurry was applied on both surfaces of the porous substrate and then allowed to stand for 5 minutes. Thereafter, the porous substrate on which the slurry was applied was sufficiently dried in a dryer at 50° C. to form inorganic particle layers each having a thickness of 2 μm. A separator was manufactured by aging the porous substrate on which the inorganic particle layers were formed at 100° C. for 12 hours.

Example 2

A separator was manufactured under the same conditions as in Example 1, except that boehmite having an average particle diameter (D50) of 0.6 μm as inorganic particles was used in the preparation of the slurry.

Example 3

A separator was manufactured under the same conditions as in Example 1, except that a polyethylene porous film (porosity: 42%, Gurley permeability: 146 sec./100 cc, tensile strength MD: 2,314 kgf/cm$^2$/TD: 2,033 kgf/cm$^2$) having a thickness of 11 μm was adopted as the porous substrate of the separator.

Example 4

A separator was manufactured under the same conditions as in Example 1, except that an inorganic particle layer having a thickness of 1.5 μm was formed on each of both surfaces of a porous substrate by adding lactic acid and performing stirring while continuously maintaining pH at 4.5 instead of $CO_2$ bubbling.

Example 5

A separator was manufactured under the same conditions as in Example 1, except that an inorganic particle layer having a thickness of 1.5 μm was formed on each of both surfaces of a porous substrate by adding acetic acid and performing stirring while continuously maintaining pH at 4.5 instead of $CO_2$ bubbling.

Example 6

A separator was manufactured under the same conditions as in Example 1, except that an inorganic particle layer having a thickness of 1 μm was formed on each of both surfaces of a porous substrate by adjusting the concentration of the slurry in the preparation of the slurry.

Comparative Example 1

A separator including inorganic particle layers each having a thickness of 2 μm was manufactured under the same conditions as in Example 1, except that a slurry was prepared by mixing 0.5 g of polyvinyl alcohol (PVA, solid content 6 wt %) having a melting temperature of 220° C. and a degree of saponification of 99% as a binder and 2.5 g of acrylic latex (ZEON, BM900B, solid content 20 wt %) having a $T_g$ of −52° C.

Comparative Example 2

A separator was manufactured under the same conditions as in Example 1, except that in the preparation of the slurry, sulfuric acid was used as an acid component and hydrolysis and condensation were performed at a pH of 3.5.

Comparative Example 3

A separator was manufactured under the same conditions as in Example 1, except that in the preparation of the slurry, hydrochloric acid was used as an acid component and hydrolysis and condensation were performed at a pH of 3.5.

Comparative Example 4

A separator was manufactured under the same conditions as in Example 1, except that $CO_2$ bubbling was not performed and hydrolysis and condensation were performed at a pH of 8.2.

Evaluation Example 1: Evaluation of Physical Properties and Electrochemical Characteristics of Separator The values of the physical properties of the separator of each of Examples and Comparative Examples are shown in Table 1. The values of the physical properties shown in Table 1 were measured by the following methods.

TABLE 1

| | Heat shrinkage rate (%) | | TMA melt fracture temperature (° C.) | | Substrate Gurley permeability (sec./100 cc) | $T_1$-$T_0$ (%) | Battery resistance DC-IR (mΩ) |
|---|---|---|---|---|---|---|---|
| | MD | TD | MD | TD | | | |
| Example 1 | 1.7 | 1.5 | 284 | 221 | 82 | 43 | 17.1 |
| Example 2 | 1.6 | 1.4 | 212 | 197 | 82 | 48 | 18.2 |
| Example 3 | 2.8 | 2.6 | 194 | 191 | 146 | 31 | 19.7 |
| Example 4 | 2.1 | 1.9 | 222 | 197 | 82 | 42 | 17.3 |
| Example 5 | 2.0 | 1.8 | 236 | 210 | 82 | 45 | 18.1 |
| Example 6 | 9.2 | 8.7 | 181 | 174 | 82 | 42 | 19.8 |
| Comparative Example 1 | 51.2 | 45.2 | 154 | 151 | 82 | 12 | 28.2 |
| Comparative Example 2 | 42 | 41 | 169 | 151 | 82 | 18 | 25.2 |
| Comparative Example 3 | 45 | 38 | 163 | 152 | 82 | 23 | 23.8 |
| Comparative Example 4 | 41 | 37 | 165 | 149 | 82 | 27 | 22.5 |

Referring to Table 1, Table 1 shows that in the Examples of the present disclosure, as the value of the amount of change in light transmittance $T_1$-$T_0$ was 30% or more, significantly improved heat resistance and electrical characteristics were simultaneously exhibited at the TMA melt fracture temperature and battery resistance, but the separators not belonging to the present invention did not satisfy these physical properties.

Meanwhile, in the case of Example 3 in which the value of the amount of change in light transmittance $T_1$-$T_0$ was 31%, the heat resistance and the electrical characteristics were excellent compared to those of the separator of each of Comparative Examples, but the heat resistance and the electrical characteristics were slightly inferior to those in other Examples in which the value of the amount of change in light transmittance $T_1$-$T_0$ was 40% or more, up to 50% or 60%.

In addition, in the case of Example 6 in which the value of the amount of change in light transmittance $T_1$-$T_0$ was 30% or more, but the heat shrinkage rate or the TMA melt fracture temperature was low, the heat resistance and the electrical characteristics were excellent compared to those in Comparative Examples, but the electrical characteristics were slightly inferior to those of other Examples satisfying the heat shrinkage rate or TMA melt fracture temperature defined in the present disclosure.

As set forth above, the heat-resistant separator of the present disclosure was obtained by the inventors recognizing for the first time that it is possible to provide a separator simultaneously having significantly improved heat resistance and electrical characteristics when the following specific Relation (1) is satisfied:

$$T_1 - T_0 \geq 30\% \tag{1}$$

wherein $T_0$ is a light transmittance measured by allowing the separator to stand at 25° C. for 1 hour and then vertically spacing the separator apart from a halogen lamp with a rated voltage of 12 V and a power consumption of 50 W by 100 mm, and $T_1$ is a light transmittance measured by allowing the separator to stand at 150° C. for 1 hour and then vertically spacing the separator apart from a halogen lamp with a rated voltage of 12 V and a power consumption of 50 W by 100 mm.

Specifically, the value of the specific Relation (1) for the amount of change in light transmittance is influenced in a complex way by a thickness of the inorganic particle layer, a particle diameter of the inorganic particle, a porosity and thickness of the porous substrate, and the like. In particular, the present disclosure was obtained by recognizing for the first time that a case in which a difference between a light transmittance value $T_1$ measured after the separator is allowed to stand at 150° C. for 1 hour and a light transmittance value $T_0$ measured after the separator is allowed to stand at 25° C. for 1 hour is 30% or more is one condition for simultaneously improving excellent thermal stability and electrical characteristics of the separator.

In an embodiment, the thermal stability and electrical characteristics of the separator may be further improved by controlling the value of the specific Relation (1) to 35% or more or 40% or more.

In an embodiment, when the separator satisfies Relation (1), and also satisfies a heat shrinkage rate in both MD and TD of 8% or less, 5% or less, 3% or less, or 2.5% or less when measured after the separator is allowed to stand at 150° C. for 60 minutes, in particular, the electrical characteristics of the separator may be significantly improved.

In an embodiment, when specimens each having a thickness of 5 to 50 μm, a width of 5 mm, and a length of 10 mm in each of MD and TD serving as length directions were prepared, and each specimen was mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, in a case where the separator has heat resistance in which at least one of the specimens is broken only at a temperature of 180° C. or higher, 190° C. or higher, 200° C. or higher, or 210° C. or higher in both MD and TD, the thermal stability and the electrical characteristics of the separator may be further improved. In one embodiment, the specimens were not broken until after a temperature 180° C. was reached.

In one embodiment, even when Relation (1) is satisfied, in a case where the heat shrinkage rate or the TMA melt fracture temperature condition is not satisfied, the electrical characteristics may not have the values obtained in the present disclosure. When the value of Relation (1) is satisfied, but the heat shrinkage rate or the TMA melt fracture temperature condition described above is not satisfied due to factors such as a pore structure or a distribution of pores of the porous substrate, the separator may not have the electrical characteristics described in the Examples above.

An embodiment for providing the above physical properties includes a secondary battery separator in which an inorganic particle layer in which pores are formed by connecting inorganic particles to each other is provided on at least one surface of a porous substrate such as a polyethylene film. In this embodiment, a separator using a hydrolytic condensate of a silane compound as a binder for the inorganic particle layer and satisfying Relation (1) and at least one of the heat shrinkage rate or the TMA melt fracture temperature condition may provide an electrochemical device having excellent electrical characteristics as well as thermal stability, the hydrolytic condensate of the silane compound being prepared under a specific condition in which a silanol or alkoxysilane-based compound is hydrolyzed and is condensation-suppressed.

In an embodiment, in a case where Relation (1) is satisfied, the method of simultaneously imparting thermal stability and electrical characteristics is not particularly limited. However, the method of imparting the above physical properties may be achieved by manufacturing a separator including an inorganic particle layer in which pores are formed by connecting inorganic particles to each other by condensing a silane compound represented by the following Chemical Formula 1 under a condition in which the silane compound is hydrolyzed and is condensation-suppressed and applying a slurry obtained by mixing the hydrolytic condensate of the silane compound with inorganic particles on one surface or both surfaces of a porous substrate formed of polyethylene or the like, but the method is not limited to these specific processes.

In one embodiment, as the method of providing the separator having the above physical properties, a separator satisfying the above physical properties may be manufactured by preparing a slurry including a silane compound of the following Chemical Formula 1 and inorganic particles, condensing the silane compound under a condition in which the silane compound is hydrolyzed and is condensation-suppressed, and then coating the prepared slurry on at least one surface of the porous substrate and drying the coated slurry.

    Chemical Formula 1

In Chemical Formula 1, 'A' is hydrogen, a polar functional group, or a C1-C10 alkyl group having a polar functional group, 'R' is independent of hydrogen or a C1-C5 alkyl group, 'a' is 0 to 2, 'b' is 2 to 4, and a+b is 4. The polar functional group may include one or two or more of an amino group, an epoxy group, a carboxyl group, a hydroxyl group, an amide group, a thiol group, a ketone group, an ester group, and an aldehyde group, or may be a reactive group that reacts with these groups.

An embodiment may provide a heat-resistant separator that may significantly improve electrical characteristics of an electrochemical device manufactured using the separator that satisfies the change in light transmittance, heat resistance, and heat shrinkage characteristics by increasing the adhesive strength between the porous substrate and the inorganic particle layer and also increasing the adhesive strength between the inorganic particles using the hydrolytic condensate of the silane compound prepared under a condition in which the silane compound is hydrolyzed and is condensation-suppressed as a binder that connects the inorganic particles and also connects together the inorganic particle layer and the porous substrate.

Further, according to another embodiment of the present disclosure, an electrochemical device including the separator obtained by any one of the disclosed embodiments may be provided.

Further, in an embodiment, when the surface of the porous substrate is modified to include a polar functional group such as a carboxyl group, an aldehyde group, or a hydroxyl group by a surface treatment including one or more of a corona discharge treatment and a plasma discharge treatment, adhesion improvements are provided. That is, the polar functional group of the binder that fixes the surface of the inorganic particle layer may be hydrogen-bonded or chemically bonded to the polar functional group provided on the surface of the surface-treated porous substrate. Therefore, the separator according to this embodiment may satisfy the condition of Relation (1), and may impart the effect of significantly improving the adhesive strength between the porous substrate and the inorganic particle layer and significantly improving the thermal stability by significantly reducing the high-temperature shrinkage rate even at a high temperature without using an organic polymer-based binder as used in the past.

Further, in one embodiment, the inorganic particle layer is formed, and then an aging process is performed, such that the adhesive strength between the porous substrate and the inorganic particle layer may be increased, and the high-temperature shrinkage characteristics may be improved.

Hereinabove, although the present disclosure has been described by specific embodiments, these embodiments have been provided only for understanding the present disclosure. Therefore, the present disclosure is not limited to the described embodiments. Various modifications and changes from this description may be made by those skilled in the art to which the present disclosure pertains.

Therefore, the scope of the present disclosure should not be limited to the described embodiments, but modifications equal or equivalent to those elements in the described embodiments fall within the scope of the present disclosure.

What is claimed is:

1. A separator for a secondary battery, the separator comprising:
   a porous substrate; and
   an inorganic particle layer provided on at least one surface of the porous substrate, wherein the inorganic particle layer comprises inorganic particles, and a hydrolytic condensate of a silane compound,
   wherein the separator satisfies the following Relation (1):

$$T1-T0 \geq 30\%, \quad (1)$$

wherein T0 is a light transmittance measured by subjecting the separator to a first temperature of 25° C. for 1 hour and then spacing the separator apart from a halogen lamp with a rated voltage of 12 V and a power consumption of 50 W by 100 mm, and T1 is a light transmittance measured by subjecting the separator to a second temperature of 150° C. for 1 hour and then spacing the separator apart from the halogen lamp with the rated voltage of 12 V and the power consumption of 50 W by 100 mm,
   wherein when specimens each having a thickness of 5 to 50 μm, a width of 5 mm, and a length of 10 mm in each of a machine direction (MD) and a transverse direction (TD) serving as length directions are prepared from the separator, and each specimen is mounted on a chamber of a thermomechanical analyzer (TMA) by hooking both ends of each specimen to a metal jig and pulled downward with a force of 0.008 N while heating at 5° C. per minute, at least one of the specimens has a heat resistance in which the specimen is not broken in both MD and TD until after a temperature 180° C. is reached.

2. The separator of claim 1, wherein a value of T1−T0 of Relation (1) is 40% or more.

3. The separator of claim 1, wherein a heat shrinkage rate in each of MD and TD is 8% or less when measured after the separator is subjected to 150° C. for 60 minutes.

4. The separator of claim 1, wherein the hydrolytic condensate of the silane compound comprises a hydrolytic condensate produced under a condition in which the silane compound is hydrolyzed and is condensation-suppressed in a weakly acidic atmosphere.

5. The separator of claim 1, wherein the silane compound is a compound represented by the following Chemical Formula 1:

$$A_aSi(OR)_b \qquad \text{Chemical Formula 1}$$

wherein 'A' is hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4, and
wherein the polar functional group includes one or two or more of an amino group, an epoxy group, a carboxyl group, a hydroxyl group, an amide group, a thiol group, a ketone group, an ester group, and an aldehyde group.

6. The separator of claim 1, wherein an average particle diameter of the inorganic particles ranges from 0.01 to 1 μm.

7. The separator of claim 1, wherein the porous substrate has a surface including a polar functional group.

8. An electrochemical device comprising the separator of claim 1.

* * * * *